(12) United States Patent
Lee

(10) Patent No.: US 9,996,277 B2
(45) Date of Patent: Jun. 12, 2018

(54) MEMORY SYSTEM AND OPERATING METHOD OF MEMORY SYSTEM

(71) Applicant: SK hynix Inc., Gyeonggi-do (KR)

(72) Inventor: Jong-Min Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 53 days.

(21) Appl. No.: 15/144,435

(22) Filed: May 2, 2016

(65) Prior Publication Data

US 2017/0147239 A1    May 25, 2017

(30) Foreign Application Priority Data

Nov. 23, 2015    (KR) .......................... 10-2015-0163771

(51) Int. Cl.
  *G06F 12/02*    (2006.01)
  *G06F 3/06*    (2006.01)
  *G06F 12/00*    (2006.01)

(52) U.S. Cl.
  CPC .......... *G06F 3/0616* (2013.01); *G06F 3/0652* (2013.01); *G06F 3/0653* (2013.01); *G06F 3/0679* (2013.01); *G06F 12/00* (2013.01); *G06F 12/0261* (2013.01)

(58) Field of Classification Search
  CPC .................................................. G06F 12/0246
  See application file for complete search history.

(56) References Cited

U.S. PATENT DOCUMENTS

| 2012/0023144 A1* | 1/2012 | Rub ................... G06F 12/0246 707/813 |
| 2016/0179386 A1* | 6/2016 | Zhang ..................... G06F 3/064 711/103 |

FOREIGN PATENT DOCUMENTS

| KR | 1020130061967 | 6/2013 |
| KR | 1020140094170 | 7/2014 |
| KR | 1020140096875 | 8/2014 |
| KR | 1020140113212 | 9/2014 |
| KR | 101454817 | 10/2014 |

* cited by examiner

*Primary Examiner* — Edward J Dudek, Jr.
(74) *Attorney, Agent, or Firm* — IP & T Group LLP

(57) ABSTRACT

This technology relates to a memory system for processing data into a memory device and an operating method of the same. The memory system may include a memory device comprising one or more closed memory blocks each including plural pages, and a controller suitable for generating valid page counts (VPCs) for each closed memory block at least two different time points, generating a VPC offset for each closed memory block between the at least two different time points, selecting a source memory block among the closed memory blocks according to the generated VPC offsets, and performing a garbage collection operation to the selected source memory block.

9 Claims, 11 Drawing Sheets

MEMORY SYSTEM AND OPERATING METHOD OF MEMORY SYSTEM

CROSS-REFERENCE TO RELATED APPLICATION(S)

The present application claims priority of Korean Patent Application No. 10-2015-0163771, filed on Nov. 23, 2015, which is incorporated herein by reference in its entirety.

BACKGROUND

1. Field

Exemplary embodiments of the present invention relate to a memory system, and more particularly, to a memory system for processing data into a memory device and an operating method of the same.

2. Description of the Related Art

The computer environment paradigm has shifted to ubiquitous computing systems that can be used anytime and anywhere. As a result, use of portable electronic devices such as mobile phones, digital cameras, and notebook computers continues to increase rapidly. These portable electronic devices generally use a memory system having one or more semiconductor memory devices also referred to as data storage devices. The data storage device may be used as a main or an auxiliary memory device of a portable electronic device.

Semiconductor memory devices provide excellent stability, durability, high information access speed, and low power consumption, since they have no moving parts. Examples of data storage devices include universal serial bus (USB) memory devices, memory cards having various interfaces, and solid state drives (SSD).

SUMMARY

Various embodiments are directed to the provision of a memory system capable of processing data more reliably and maximizing the use efficiency of a memory device and an operating method of the memory system.

In an embodiment, a memory system may include a memory device comprising one or more closed memory blocks each including plural pages; and a controller may be suitable for: generating valid page counts (VPCs) for each closed memory block at least two different time points; generating a VPC offset for each closed memory block between the at least two different time points; selecting a source memory block among the closed memory blocks according to the generated VPC offsets; and performing a garbage collection operation to the selected source memory block.

The controller may select a closed memory block having a VPC offset equal to or smaller than a predetermined VPC offset threshold as the source memory block.

When there are two or more closed memory blocks having a VPC offset equal to or smaller than the predetermined VPC offset threshold, the controller may select a closed memory block having the smallest VPC among the current VPCs as the source memory block among the two or more closed memory blocks having a VPC offset equal to or smaller than the predetermined VPC offset threshold.

The predetermined VPC offset threshold may be set to be equal to the smallest generated VPC offset.

The controller may iteratively perform the garbage collection operation to the selected source memory block by selecting the source memory block among the close memory blocks in an ascending order of the generated VPC offsets and the current VPCs.

In an embodiment, a memory system, may include: a memory device comprising plural memory blocks; and a controller may be suitable for: generating erase counts (ECs) for each memory block at least two different time points; generating an EC offset for each memory block between the generated erase counts at the at least two different time points; selecting a source memory block and a target memory block among the memory blocks according to the generated EC offsets; and performing a wear leveling operation to the selected source and target memory blocks.

The controller may select a memory block having an EC offset equal to or smaller than to a first predetermined EC offset threshold as the source memory block.

When there are two or more memory blocks having an EC offset equal to or smaller than the first predetermined EC offset threshold, the controller may select a memory block having the smallest EC in a current list of ECs as the source memory block among the memory blocks having an EC offset equal to or smaller than the first predetermined threshold.

The first predetermined EC offset threshold may be set to be the smallest generated EC offset.

The controller may iteratively perform the wear leveling operation to the selected source memory block by selecting the source memory block among the memory blocks in an ascending order of the generated EC offsets and the current ECs.

The controller may select a memory block having an EC offset equal to or greater than a second predetermined EC offset threshold as the target memory block.

When there are two or more memory blocks having an EC offset equal to or greater than the second predetermined EC offset threshold, the controller may select a memory block having the greatest EC in the current ECs as the target memory block among the memory blocks having the EC offset equal to or greater than the second predetermined threshold.

The second predetermined EC offset threshold may be set to be the greatest generated EC offset between the EC offsets.

The controller may iteratively perform the wear leveling operation to the selected target memory block by selecting the target memory block among the memory blocks in a descending order of EC offsets and the current ECs.

In an embodiment, an operating method of a memory system including one or more closed memory blocks each including plural pages, the operation method may include: generating valid page counts (VPCs) for each closed memory block at the at least two different time points; generating a VPC offset for each closed memory block; selecting a source memory block among the closed memory blocks according to the generated VPC offsets; and performing a garbage collection operation to the selected source memory block.

The selecting of the source memory block may be performed by selecting one having a VPC offset equal to or smaller than a predetermined EC offset threshold as the source memory block.

When there are two or more close memory blocks having a VPC offset equal to or smaller than the predetermined EC offset threshold, the selecting of the source memory block may be performed by selecting a memory block having the smallest VPC in the current VPCs as the source memory block among the close memory blocks having a VPC offset equal or smaller than the predetermined EC offset threshold.

The predetermined VPC offset threshold may be the smallest VPC offset between the VPC offsets.

The garbage collection to the selected source memory block may be iteratively performed by selecting the source memory block among the closed memory blocks in ascending order of the VPC offsets and the current VPCs.

In an embodiment, an operating method of a memory system including plural memory blocks, the operation method may include: generating erase counts (ECs) for each memory block at the at least two different time points; generating an EC offset each memory block between the at least two different time points; selecting source and target memory blocks among the memory blocks according to generated EC offsets; and performing a wear leveling operation to the selected source and target memory blocks.

The selecting of the source memory block may be performed by selecting a memory block having an EC offset that is equal or smaller to a first predetermined EC offset threshold as the source memory block.

When there are two or more close memory blocks having an EC offset equal or smaller to the first predetermined threshold, the selecting of the source memory block may be performed by selecting a memory block having the smallest EC in the current ECs as the source memory block among the memory blocks having the EC offset equal or smaller to the first predetermined EC offset threshold.

The first predetermined EC offset threshold may be set to be the smallest EC offset between the generated EC offsets.

The wear leveling operation to the selected source memory block may be iteratively performed by selecting the source memory block among the memory blocks in an ascending order of the EC offsets and current ECs.

The selecting of the target memory block may be performed by selecting a memory block having an EC offset equal to or greater than a second predetermined EC offset threshold as the target memory block.

When there are two or more memory blocks having an EC offset equal or over to the second predetermined EC offset threshold, the selecting of the target memory block may be performed by selecting a memory block having the greatest EC in the current ECs as the target memory block among the memory blocks having the EC offset equal to or greater than the second predetermined EC offset threshold.

The second predetermined EC offset threshold may be the greatest offset between the generated EC offsets.

The wear leveling operation to the selected source memory block may be iteratively performed by selecting the target memory block among the memory blocks in a descending order of the generated EC offsets and the current ECs.

DETAILED DESCRIPTION

Figure 1:
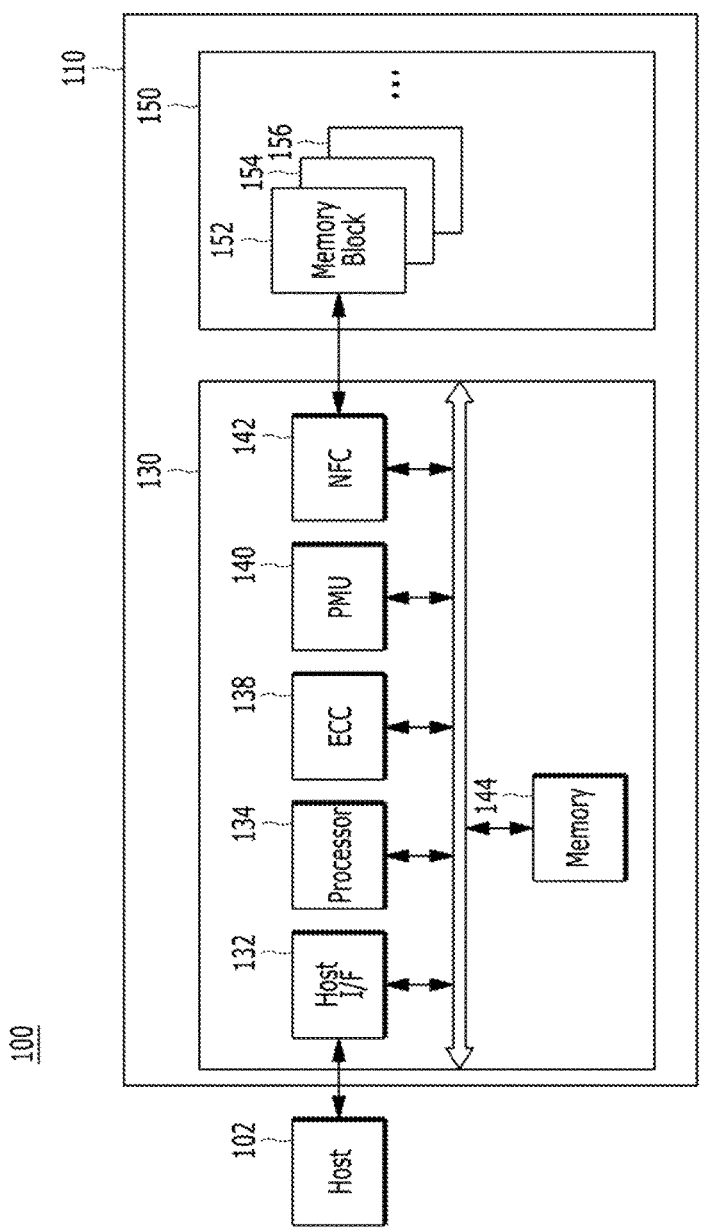
FIG. 1 is a diagram illustrating a data processing system including a memory system, in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. Furthermore, the terms "comprises," or "includes," or "has" when used should be understood as inclusive allowing the presence of other elements in addition to those elements specifically stated. Moreover, terms of singular form may include plural forms unless stated otherwise.

FIG. 1 is a block diagram illustrating a data processing system including a memory system in accordance with an embodiment.

Referring to FIG. 1, a data processing system 100 may include a host 102 and a memory system 110.

The host 102 may include, for example, a portable electronic device, such as a mobile phone, an MP3 player and a laptop computer or an electronic device, such as a desktop computer, a game player, a TV and a projector.

The memory system 110 may operate in response to a request from the host 102, and in particular, store data to be accessed by the host 102. In other words, the memory system 110 may be used as a main memory system or an auxiliary memory system of the host 102. The memory system 110 may be implemented with any one of various kinds of storage devices according to the protocol of a host interface to be electrically coupled with the host 102. The memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device and configure a memory card. The controller 130 and the memory card 150 may be integrated into one semiconductor device and configure a memory card such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may configure part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted and, in particular, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and/or may store the data provided from the host 102 into the memory device 150. To this end, the controller 130 may control overall operations of the memory device 150, such as read, write, program and erase operations.

In detail, the controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
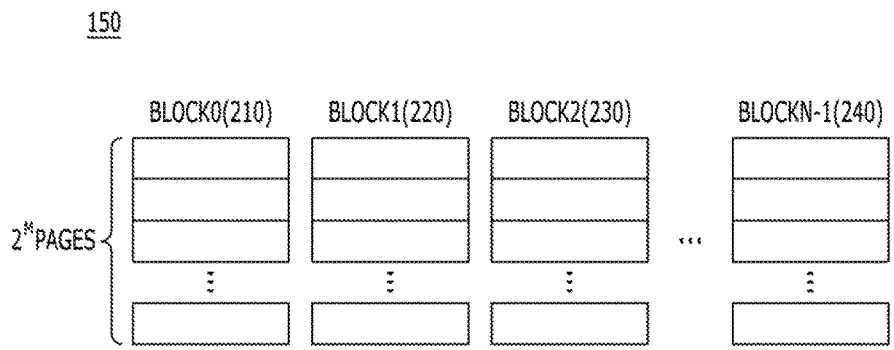
FIG. 2 is a diagram illustrating an example of a memory device employed in the memory system shown in FIG. 1.

FIG. 2 is a schematic diagram illustrating the memory device 150 shown in FIG. 1.

Referring to FIG. 2, the memory device 150 may include a plurality of memory blocks, for example, zeroth to (N−1)$^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells, to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
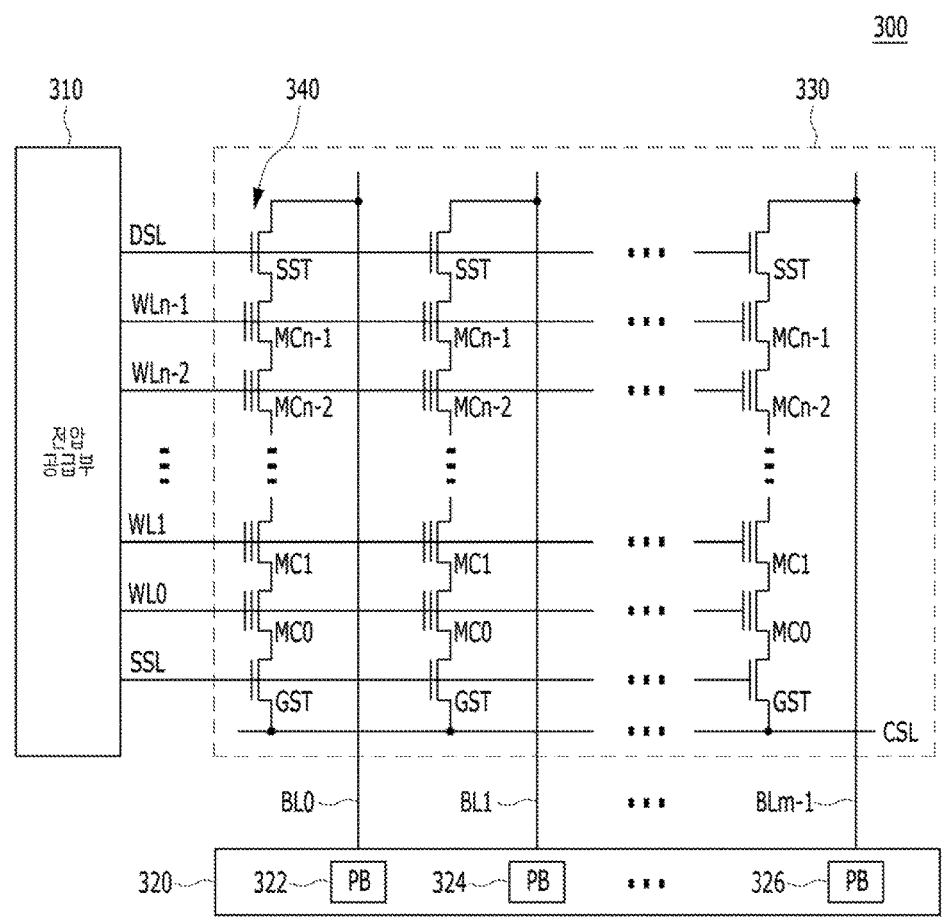
FIG. 3 is a circuit diagram illustrating an example of a memory block in a memory device, in accordance with an embodiment of the present invention.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by multi-level cells (MLC) each of which stores data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, the memory block 152 which is configured by NAND flash memory cells, it is to be noted that the memory block 152 of the memory device 150 in accordance with the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating the memory device 150 shown in FIG. 1.

Figure 4:
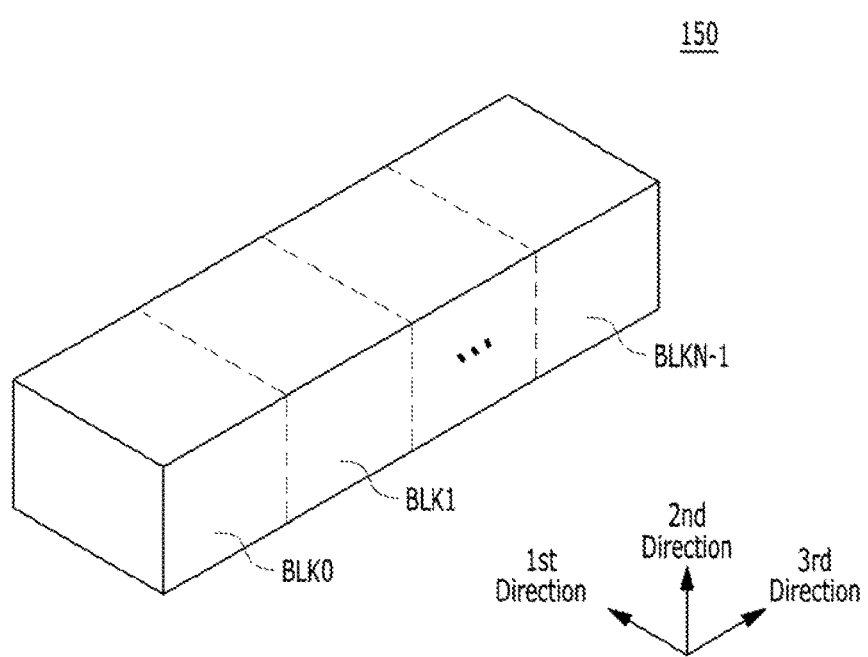
FIGS. 4 to 11 are diagrams schematically illustrating various aspects of the memory device shown in FIG. 2.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN−1, and each of the memory blocks BLK0 to BLKN−1 may be realized in a three-dimensional (3D) structure or a vertical structure. The respective memory blocks BLK0 to BLKN−1 may include structures which extend in first to third directions, for example, an x-axis direction, a y-axis direction and a z-axis direction.

The respective memory blocks BLK0 to BLKN−1 may include a plurality of NAND strings NS which extend in the second direction. The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. Namely, the respective memory blocks BLK0 to BLKN−1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
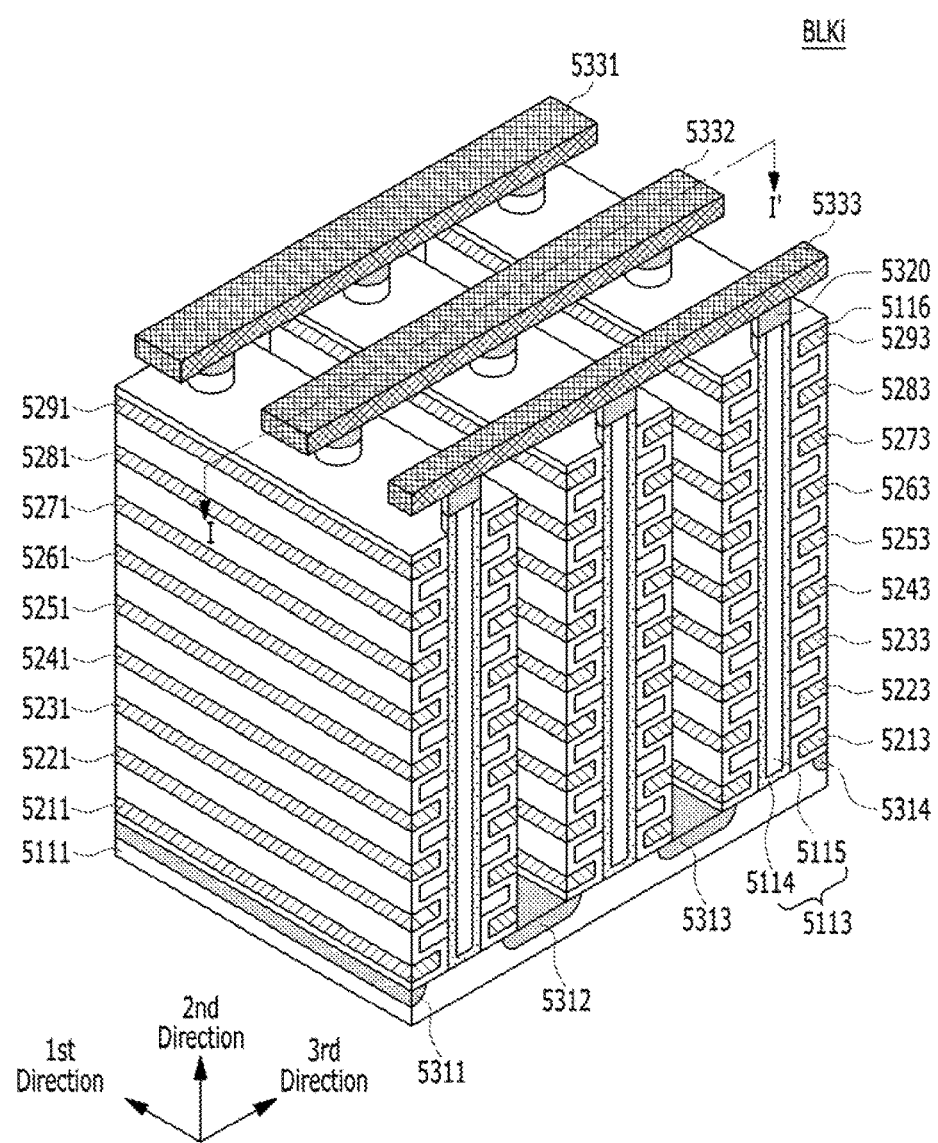
Figure 6:
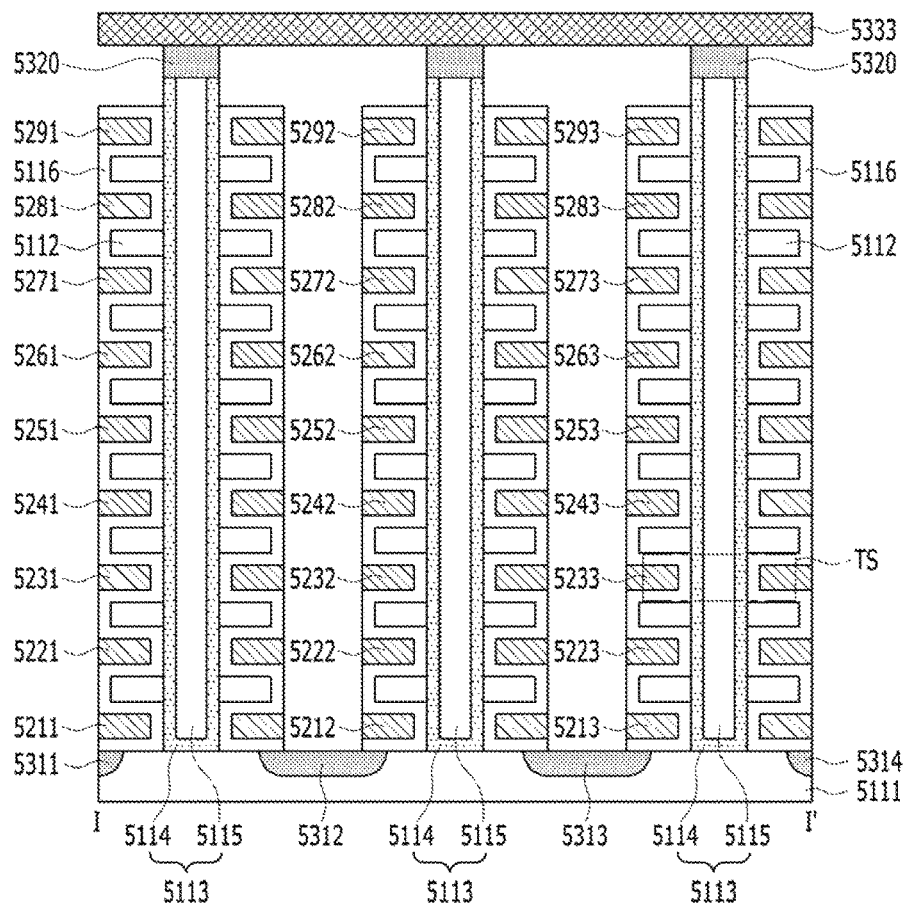

FIG. 5 is a perspective view of one BLKi of the plural memory blocks BLK0 to BLKN−1 shown in FIG. 4. FIG. 6 is a cross-sectional view taken along a line I-I' of the memory block BLKi shown in FIG. 5.

Referring to FIGS. 5 and 6, a memory block BLKi, among the plurality of memory blocks of the memory device 150, may include a structure which extends in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While it is assumed that the substrate 5111 is a p-type silicon, however, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the substrate 5111. The plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 which extend in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 which extend in the first direction may be provided between the dielectric materials 5112. The conductive material 5291 which extends in the first direction may be provided over the uppermost dielectric material 5112. The conductive materials 5211 to 5291 which extend in the first direction may be a metallic material. The conductive materials 5211 to 5291 which extend in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333, which extend in the third direction, may be electrically coupled with through contact plugs. The conductive materials 5331 to 5333, which extend in the third direction, may be a metallic material. The conductive materials 5331 to 5333, which extend in the third direction, may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 which extend in the first direction. The respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
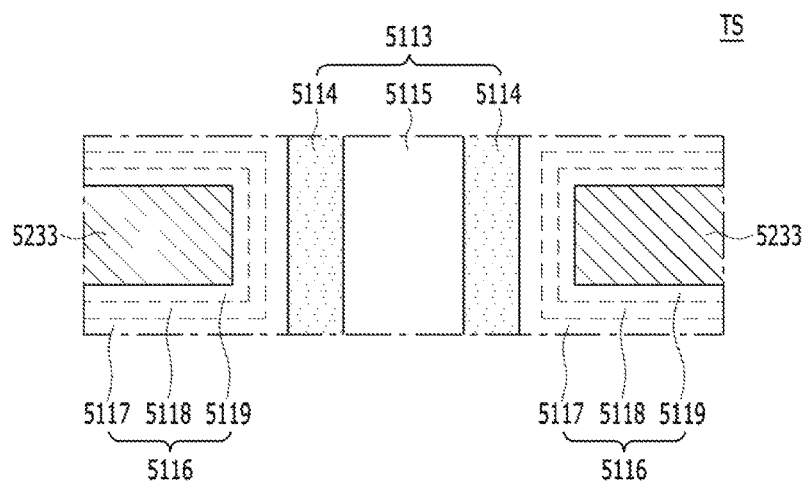

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. In other words, the gates or the control gates may extend in the first direction and form word lines and at least two select lines, at least one source select line SSL and at least one ground select line GSL.

The conductive materials 5331 to 5333 which extend in the third direction may be electrically coupled to one end of the NAND strings NS. The conductive materials 5331 to 5333 which extend in the third direction may serve as bit lines BL. That is, in one memory block BLKi, the plurality of NAND strings NS may be electrically coupled to one-bit line BL.

The second type doping regions 5311 to 5314 which extend in the first direction may be provided to the other ends of the NAND strings NS. The second type doping regions 5311 to 5314 which extend in the first direction may serve as common source lines CSL.

Namely, the memory block BLKi may include a plurality of NAND strings NS which extend in a direction perpendicular to the substrate 5111, e.g., the second direction, and may serve as a NAND flash memory block, for example, of a charge capturing type memory, in which a plurality of NAND strings NS are electrically coupled to one-bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are electrically coupled to one-bit line BL, it is to be noted that the embodiment is not limited to having 3 NAND strings NS that are electrically coupled to one-bit line BL. In the memory block BLKi, m number of NAND strings NS may be electrically coupled to one-bit line BL, m being a positive integer. According to the number of NAND strings NS which are electrically coupled to one-bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
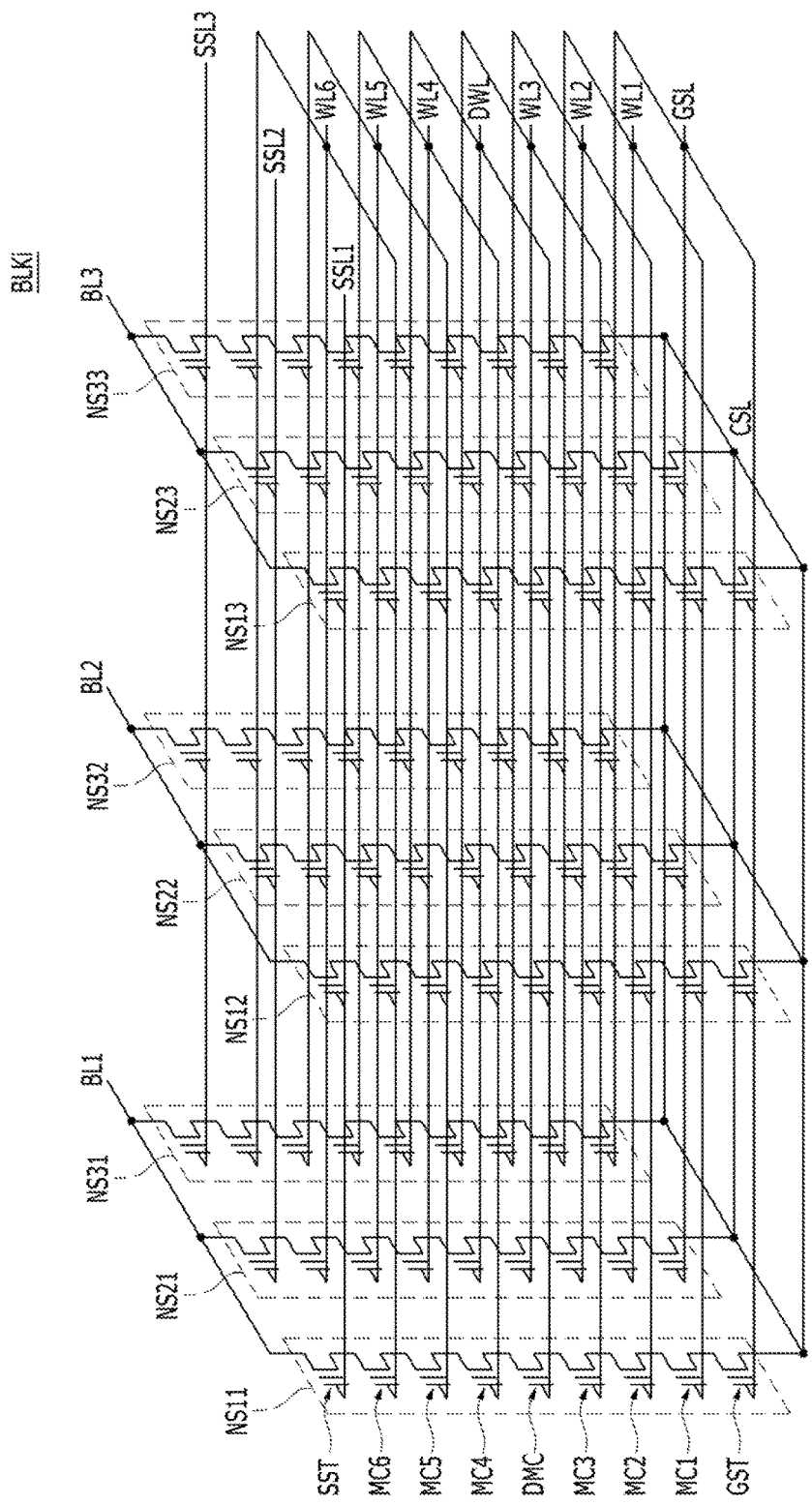

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one-bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 which extend in the first direction may be provided. The conductive materials 5211 to 5291, 5212 to 5292 and 5213 to 5293 which extend in the first direction may be electrically coupled in common to upper layers through contacts. At the upper layers, the conductive materials 5211 to 5291, 5212 to 5292 and 5213 to 5293 which extend in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

Namely, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system in accordance with an embodiment implemented with a three-dimensional (3D) nonvolatile memory device different from the first structure.

Figure 9:
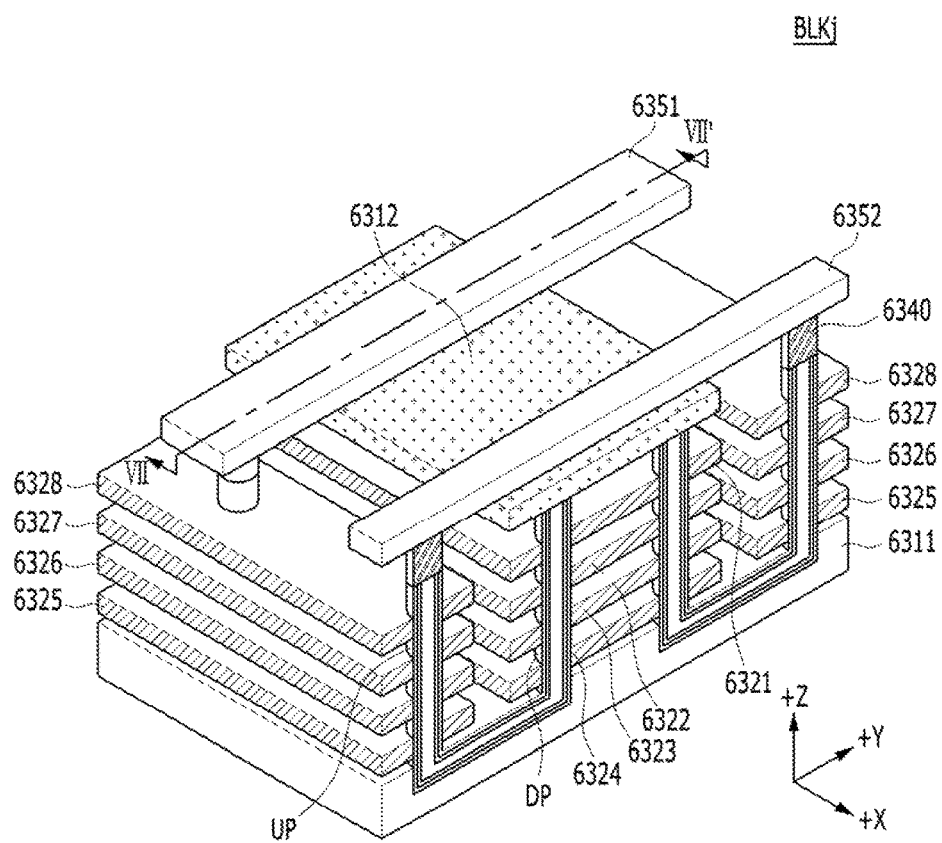

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line VII-VII' of FIG. 9.

Figure 10:
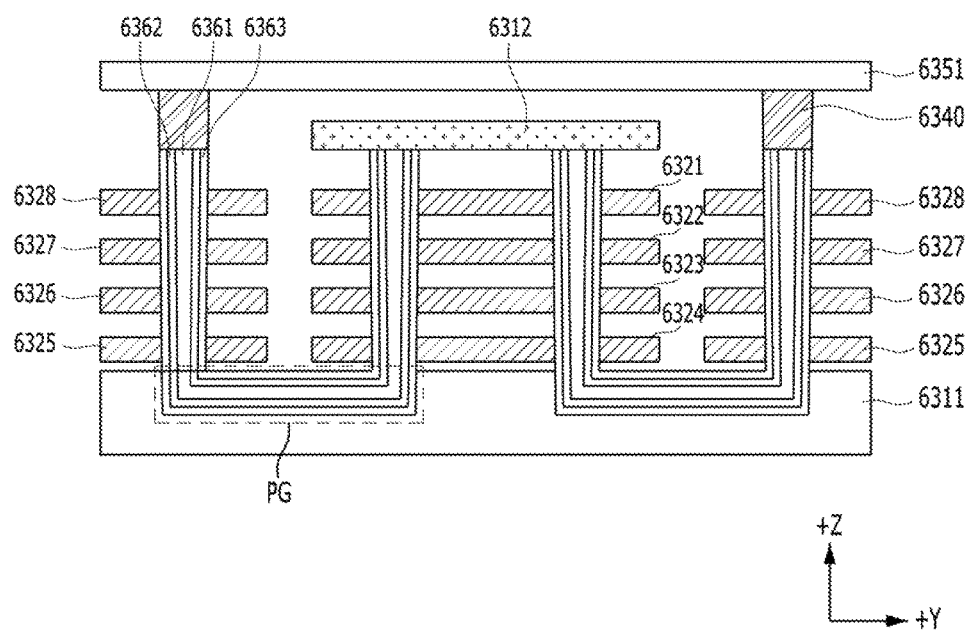

Referring to FIGS. 9 and 10, the memory block BLKj among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 which extend in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and/or a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 which extend in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
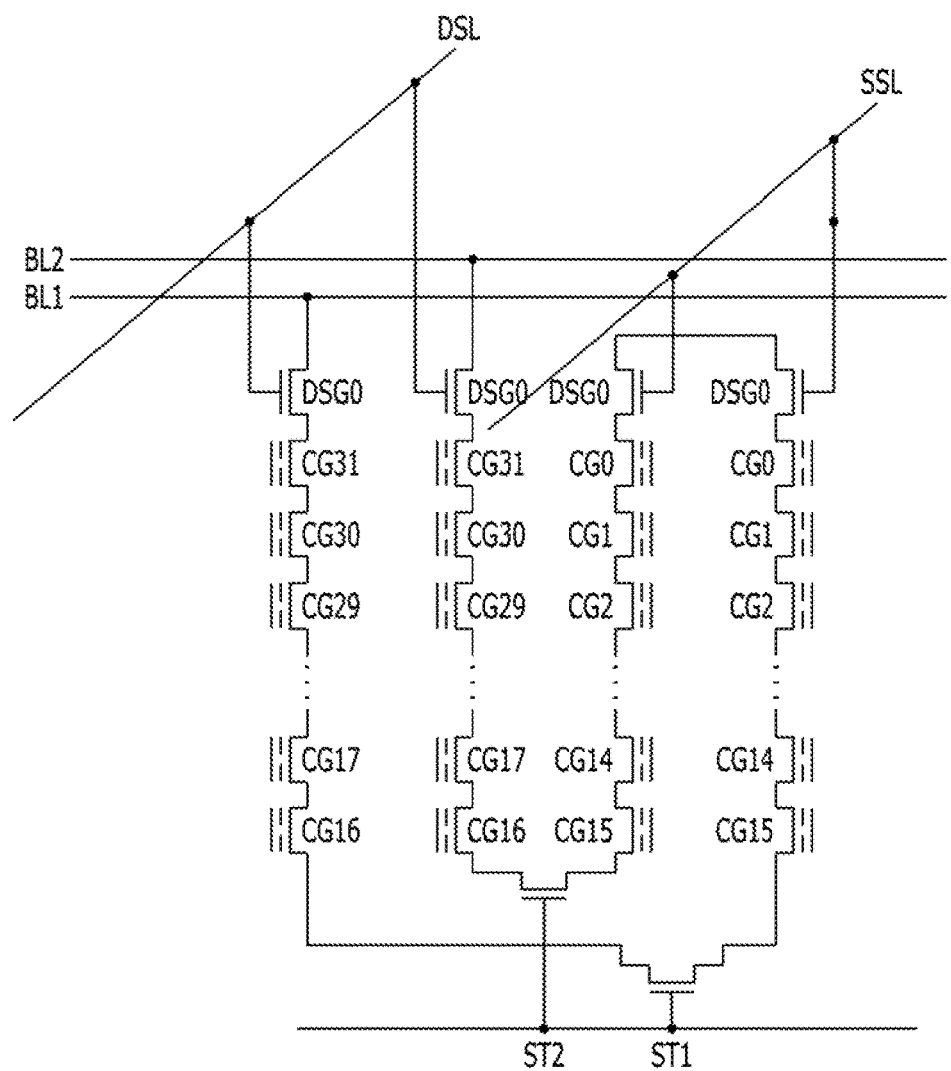

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Figure 12:
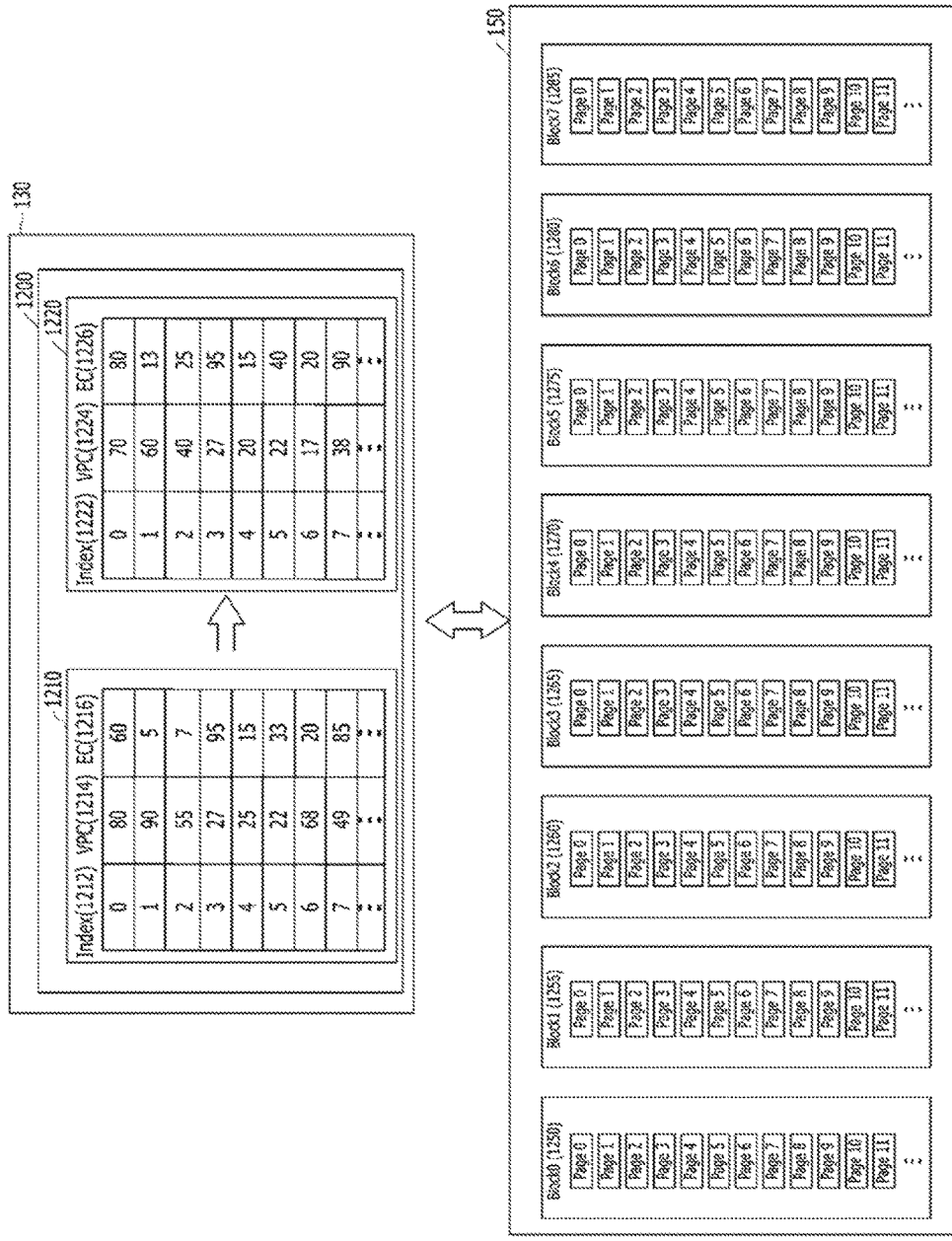
FIG. 12 is a diagram schematically illustrating an example of an operation method for the memory system of FIG. 1, in accordance with an embodiment of the present invention.

FIG. 12 is a diagram illustrating an operation method of the memory system 110 shown in FIG. 1.

Each of the memory blocks of the memory device 150 has a limited erase count EC, within which an erase operation may be performed. A memory block, having an EC which is over the limited EC, may be treated as a bad block, i.e., a memory block which cannot be used any longer. That is, the limited EC represents a maximum erase count allowed for each memory block. The erase count EC is also often referred to as a program/erase (P/E) cycle or erase/write (E/W) cycle.

In an embodiment of the present invention, the memory system 110 performs a wear leveling (WL) operation to the memory device 150 so that the ECs of the memory blocks are substantially equalized.

When a write command is provided along with new write data for previously programmed data, an program update is performed with the new write data on another page of the same memory block which had the previously programmed data. Accordingly, the previously programmed data becomes invalid data, and the page containing the previously programmed data becomes an invalid page.

For example, the controller 130 stores a first write data in the buffer included in the memory 144 and performs the program operation by storing the first write data of the buffer into a first page in a first memory block in response to a first write command. When the controller 130 receives a second write command for a second write data corresponding to the first write data stored in the first page of the first memory block, the controller 130 performs the program operation by storing the second write data into a second page of the first memory block or a first page of a second memory block. In this case, the first write data stored in the first page of the first memory block becomes invalid data, and the first page of the first memory block becomes an invalid page. The programming of the second write data which invalidates the first write data is referred to as a program update operation.

The memory system 110 may perform a garbage collection (GC) operation to the memory blocks. For example, during a GC operation, the controller 130 copies valid data of a valid page of a program-completed memory block (also referred to as a closed memory block), and stores the copied valid data into an empty memory block. The memory system 110 may generate an empty memory block by performing GC to the valid pages of the closed memory blocks according to the valid page counts (VPCs) indicating the number of valid pages in the closed memory blocks.

In an embodiment of the present invention, the GC operation is performed to the memory blocks according to the VPC offsets of valid pages of the closed memory blocks. The VPC offset for each memory block is a difference between the VPCs generated at a first time and a second time points. During the GC operation, a source memory block is selected from the closed memory blocks according to the generated VPC offsets, valid data stored in the source memory block is copied and stored in a target memory block (e.g., an empty memory block), and an erase operation is performed to the source memory block in order to generate an empty memory block.

In an embodiment of the present invention, a WL operation is performed on the memory blocks according to the EC updated as the memory system 110 performs the erase operation to the memory blocks in response to the erase command.

In an embodiment of the present invention, a WL operation is performed according to generated EC offsets of the memory blocks. The EC offset for each memory block is a difference between ECs generated at a first and a second time points.

Referring to FIG. 12, the controller 130 stores write data, in a buffer included in the memory 144 and programs the stored data of the buffer into one of a plurality of memory blocks 1250 to 1285 of the memory device 150.

In an embodiment of the present invention, when a program update is performed to data stored in the memory blocks, the controller 130 identifies the valid pages of the memory blocks subject to the program update, and generate VPC lists 1214 and 1224 indicative of the number of valid pages included in the closed memory blocks for each index 1212 and 1222 for each closed memory block. The VPC list 1214 and 1224 may be stored in the memory 144. The controller 130 generates the VPC lists 1214 and 1224 at two different time points, e.g. a first and second time points, and identifies a VPC offset for each closed memory block from the generated VPCs included in the VPC lists 1214 and 1224.

The controller 130 performs the GC operation to the closed memory blocks according to the generated VPC offsets for each closed memory block in the VPC list 1214 and 1224 as described below. During a GC operation, the controller 130 selects a source memory block from the closed memory blocks according to the generated VPC offsets for the closed memory blocks, copies the valid data of the source memory block to a target memory block, and empties the source memory block to become an empty memory block by performing an erase operation to the source memory block.

During the GC operation to the memory blocks 1250 to 1285, the controller 130 identifies the VPC offset for each closed memory block from the generated VPCs in the lists 1214 and 1224 of the closed memory blocks 1250 to 1285 in the lists 1210 and 1220 generated at the first and second time points, respectively. It is assumed in this embodiment that all of the memory blocks 1250 and 1285 are closed memory blocks.

For example, based on the VPC lists 1214 and 1224 of the lists 1210 and 1220, the controller 130 identifies VPC offsets between the first and second time points of "10", "30", "15", "0", "5", "0", "51" and "11" corresponding to the respective closed memory blocks 1250 to 1285.

The controller 130 may then select a closed memory block among the close memory blocks 1250 to 1285 which has a VPC offset equal to or smaller than a predetermined VPC offset threshold as the source memory block for the GC operation. The VPC offset threshold may be the smallest VPC offset observed between the first and second time points, e.g., in the example shown in FIG. 12 the VPC offset threshold may have a value of "0" which is observed for both the fourth block Block3 (1265) and the sixth block block5 (1275).

When there are two or more memory blocks having a VPC offset below the predetermined VPC offset threshold (e.g., the fourth and sixth memory blocks 1265 and 1275 indicated by indexes "3" and "5"), the controller 130 may select memory block having the smallest VPC in the current list of VPCs ("current VPCs") as the source memory block among the closed memory blocks having a VPC offset equal to or smaller than the predetermined VPC offset threshold. Hence, in the example of FIG. 12, the controller 130 may select the sixth memory block block5 (1275) indicated by index "5" and having the smallest VPC "22" in the current VPC list 1224 among the closed memory blocks having a VPC offset below the predetermined VPC offset threshold.

The controller 130 may then perform the GC operation to the sixth memory block 1275 having the smallest VPC offset, and the smallest VPC in the current VPC list 1224 among the memory blocks having the a VPC offset equal to or smaller than the VPC offset threshold (e.g., the smallest VPC offset), as the source memory block which may be emptied to become an empty memory block.

Even though above, it was assumed, as an example, that the predetermined VPC offset threshold is the smallest generated VPC offset, in other embodiments a predetermined threshold VPC offset value, e.g., a value of "5", may be set which is greater than the smallest generated VPC offset. In this example, of a predetermined VPC offset value of "5", referring again to the example of FIG. 12, the fourth, fifth and sixth memory blocks, i.e., memory block Block3 (1265), Block4 (1270) and Block5 (1275) (Indicated by indexes "3", "4" and "5") may be selected as candidates for becoming the source memory block, and finally the sixth memory block Block5 (1275) (indicated by index "5") which has the smallest VPC value of "22" in the current VPC list 1224 of the second time point among the fourth to sixth memory blocks is selected as the source memory block among the candidates (i.e., the fourth to sixth memory blocks 1265 to 1275).

In an embodiment, the controller 130 may iteratively perform the GC operation to the source memory block by selecting the source memory block among the closed memory blocks 1250 to 1285 in an ascending order starting with the closed memory block having a VPC offset below a predetermined VPC offset threshold (e.g. the smallest observed VPC offset between two time points) or if two or more closed memory blocks have a VPC offset below the predetermined VPC offset threshold starting with the closed memory block having the smallest VPC value among the two or more closed memory blocks which have a VPC offset below the predetermined VPC offset threshold.

Accordingly, the use efficiency of the memory blocks 1250 to 1285 included in the memory device 150 can be maximized because the GC operation is performed more efficiently.

In an embodiment of the present invention, each time an erase operation is performed in response to an erase command, the controller 130 updates the erase count ("EC") of the memory block, on which the erase operation is performed, and generate EC counts included in lists 1216 and 1226 indicating the number of erase counts for each of the memory blocks 1250 to 1285 corresponding to the indexes of the index lists 1212 and 1222. The EC list 1216 and 1226 may be stored in the memory 144. The controller 130 generates the EC lists 1216 and 1226 at different time points, e.g. a first and second time point, and identifies an EC offset for each memory block from the generated EC lists 1216 and 1226.

The controller 130 performs a WL operation to the memory blocks 1250 to 1285 according to the EC offset for each close memory block in the EC lists 1216 and 1226 as will be described below. During a WL operation, the controller 130 selects a source memory block and a target memory block from the memory blocks 1250 to 1285 according to the EC offsets for each memory block, and swaps data between the selected source and target memory blocks.

During the WL operation to the memory blocks 1250 to 1285, the controller 130 identifies the EC offsets from the EC lists 1216 and 1226 in the lists 1210 and 1220 generated at the first and second time points, respectively.

For example, the controller 130 identifies the EC offsets of "20", "8", "18", "0", "0", "7", "0", and "5" for the memory blocks 1250 to 1285, respectively, based on the EC lists 1216 and 1226 of the lists 1210 and 1220, respectively generated at the first and second time points.

The controller 130 may select a memory block having an EC offset equal to or smaller than a first predetermined EC offset threshold (e.g., one having the smallest offset between the ECs) among the memory blocks 1250 to 1285 as the source memory block for the WL operation.

When there are two or more memory blocks having an EC offset below the first predetermined EC offset threshold (e.g., the smallest offset between the ECs, such as the fourth, fifth and seventh memory blocks 1265, 1270 and 1280 indicated by indexes "3", "4" and "6"), the controller 130 may select one having the smallest EC in the current list (e.g. the fifth memory block 1270 indicated by index "4" and having the smallest EC "15" in the EC list 1226 of the second time point) as the source memory block among the memory blocks having an EC offset below the predetermined EC offset.

The controller 130 may select a memory block having an EC offset over a second predetermined EC offset threshold (e.g., a memory block having the greatest offset between the ECs: the first memory block 1250 indicated by index "0" having the offset "20" between the ECs) as the target memory block for the WL operation.

When there are two or more memory blocks having an EC offset above the second predetermined EC offset threshold value (e.g. two or more memory blocks having the greatest observed EC offset) the controller 130 may select a memory block having the greatest EC value in the current list among the memory blocks having an EC offset above the second EC offset threshold (e.g. among the two or more memory blocks having the greatest EC offset).

In another embodiment, the controller 130 may select a memory block having the greatest EC in the current list among the memory blocks (e.g., the fourth memory block 1265 indicated by index "3" and having the greatest EC "95" in the EC list 1226 of the second time point) as the target memory block.

The controller 130 may perform the WL operation to the fifth memory block 1270 having the greatest EC offset and the smallest EC in the current EC list 1226 as the source memory block and the first or fourth memory block 1250 or 1265 as the target memory block.

Even though it was assumed above, for example, that the predetermined EC offset threshold is the smallest generated EC offset, a predetermined EC offset threshold value (e.g., a value of "7") may be set as the predetermined EC offset threshold value. In this example of the predetermined value of "7" as the predetermined EC offset threshold, the fourth to eighth memory blocks 1265 to 1285 indicated by indexes "3" to "7" may be candidates for the source memory block, and finally the fifth memory block 1270 indicated by index "4" and having the smallest EC "15" in the EC list 1226 of the second time point may be selected as the source memory block among the candidates (the fourth to eighth memory blocks 1265 to 1285).

As such, the controller 130 may iteratively perform the WL operation to the source and target memory blocks by selecting the source memory block among the memory blocks 1250 to 1285 in an ascending order of the EC offsets and the EC values in the current EC list 1224 ("current ECs"), and by selecting the target memory block among the memory blocks 1250 to 1285 in a descending order of the EC offsets and the current ECs.

Accordingly, the use efficiency of memory blocks 1250 to 1285 included in the memory device 150 can be maximized because the WL operation is performed more efficiently.

Figure 13:
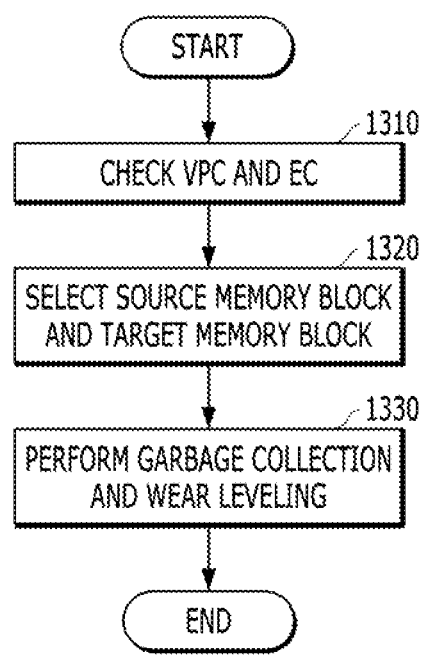
FIG. 13 is a flowchart illustrating an operation method of a memory system, in accordance with an embodiment of the present invention.

FIG. 13 is a flowchart illustrating the operation method of the memory system 110 shown in FIG. 12.

It is assumed that the controller 130 generates the VPC lists 1214 and 1224 and the EC lists 1216 and 1226 at different time points, e.g., at a first and second time points, as described above with reference to FIG. 12.

Referring to FIG. 13, at step 1310, the memory system 110 identifies a VPC offset for each close memory block from the generated plural VPC lists 1214 and 1224 which are generated at two different time points, e.g. a first and second time points. The controller also identifies an EC offset for each memory block from the generated plural EC lists 1216 and 1226 generated at two different time points, e.g. a first and second time points. The first and second time points for generating the VPC and the EC lists may be the same.

At step 1320, the memory system 110 selects the source memory block for the GC operation among the close memory blocks according to the VPC offset for each closed memory block, and selects the source memory block and the target memory block for the WL operation from the memory blocks according to the EC offset for each memory block, as described in detail above with reference to FIG. 12.

At step 1330, the memory system 110 performs the GC operation to the selected source memory block and the WL operation to the selected source memory block and the target memory block, as described with reference to FIG. 12.

As described above, a memory system and an operating method thereof are provided in accordance with embodiments of the present invention that can minimize the complexity, optimize the and performance of the memory system and process data more rapidly and stably by maximizing the use efficiency of a memory device.

Although various embodiments have been described for illustrative purposes, it will be apparent to those skilled in the art that various changes and modifications may be made without departing from the spirit and/or scope of the invention as defined in the following claims.

What is claimed is:

1. A memory system, comprising:
a memory device comprising one or more closed memory blocks each including plural pages; and
a controller suitable for:
generating valid page counts (VPCs) for each closed memory block at least two different time points;
generating a VPC offset for each closed memory block between the at least two different time points;
selecting a source memory block among the closed memory blocks according to the generated VPC offsets; and
performing a garbage collection operation to the selected source memory block; and
wherein the controller selects a closed memory block having a VPC offset equal to or smaller than a predetermined VPC offset threshold as the source memory block; and
wherein when there are two or more closed memory blocks having a VPC offset equal to or smaller than the predetermined VPC offset threshold, the controller selects a closed memory block having the smallest VPC among the current VPCs as the source memory block among the two or more closed memory blocks having a VPC offset equal to or smaller than the predetermined VPC offset threshold.

2. The memory system of claim 1, wherein the predetermined VPC offset threshold is set to be equal to the smallest generated VPC offset.

3. The memory system of claim 1, wherein the controller iteratively performs the garbage collection operation to the selected source memory block by selecting the source memory block among the close memory blocks in an ascending order of the generated VPC offsets and the current VPCs.

4. A memory system, comprising:
a memory device comprising plural memory blocks; and
a controller suitable for:
generating erase counts (ECs) for each memory block at least two different time points;
generating an EC offset for each memory block between the generated erase counts at the at least two different time points;
selecting a source memory block and a target memory block among the memory blocks according to the generated EC offsets; and
performing a wear leveling operation to the selected source and target memory blocks; and
wherein the controller selects a memory block having an EC offset equal to or smaller than to a first predetermined EC offset threshold as the source memory block;
wherein when there are two or more memory blocks having an EC offset equal to or smaller than the first predetermined EC offset threshold, the controller selects a memory block having the smallest EC in a current list of ECs as the source memory block among the memory blocks having an EC offset equal to or smaller than the first predetermined threshold; and
wherein the first predetermined EC offset threshold is set to be the smallest generated EC offset.

5. The memory system of claim 4, wherein the controller iteratively performs the wear leveling operation to the selected source memory block by selecting the source memory block among the memory blocks in an ascending order of the generated EC offsets and the current ECs.

6. The memory system of claim 4, wherein the controller selects a memory block having an EC offset equal to or greater than a second predetermined EC offset threshold as the target memory block.

7. The memory system of claim 6, wherein when there are two or more memory blocks having an EC offset equal to or greater than the second predetermined EC offset threshold, the controller selects a memory block having the greatest EC in the current ECs as the target memory block among the memory blocks having the EC offset equal to or greater than the second predetermined threshold.

8. The memory system of claim 6, wherein the second predetermined EC offset threshold is set to be the greatest generated EC offset among the EC offsets.

9. The memory system of claim 7, wherein the controller iteratively performs the wear leveling operation to the selected target memory block by selecting the target memory block among the memory blocks in a descending order of EC offsets and the current ECs.

* * * * *